INVENTORS
Elmer E. Lundvall
Ralph W. Becker
Conrad Eckstein
BY WHITEHEAD & VOGL
PER Earle Whitehead
ATTORNEYS Sept. 9, 1952     E. E. LUNDVALL ET AL     2,610,034
MILK COOLING ATTACHMENT FOR MILKING MACHINES
Filed Aug. 22, 1949     2 SHEETS—SHEET 2

INVENTORS
Elmer E. Lundvall
Ralph W. Becker
Conrad Eckstein
BY    WHITEHEAD & VOGL
PER *Earle Whitehead*
ATTORNEYS Patented Sept. 9, 1952

2,610,034

UNITED STATES PATENT OFFICE 2,610,034

MILK COOLING ATTACHMENT FOR MILKING MACHINES

Elmer E. Lundvall, Weld County, Ralph W. Becker, Arapahoe County, and Conrad Eckstein, Jefferson County, Colo., assignors to Instant Milk Cooling Company, Inc., Greeley, Colo., a corporation of Colorado Application August 22, 1949, Serial No. 111,662

13 Claims. (Cl. 257—187)

This invention relates to a milking machine milk-cooling attachment having a reservoir with a cooling element depending therefrom, and is especially though not exclusively, adapted to be interposed between a conventional milk container and a milking machine head which normally seats on the container with a vacuumtight fit.

Objects of the invention are to provide, in a device of the class described, (a) simplification and other improvements in the structure of the cooling grid while retaining the feature of simultaneous and substantially equal flow of cooling fluid through all transverse tubes of the grid, (b) improved means for regulating the flow of milk from the reservoir to the cooling grid combined with means to prevent the backing of the milk from the reservoir into the vacuum system of the milking machine, and (c) means for precooling the milk in the reservoir prior to delivery to the grid.

With the foregoing and other objects in view, all of which shall more fully hereinafter appear, the invention comprises certain novel constructions, arrangements and combinations of parts as shall now be described and as defined in the appended claims and illustrated in preferred embodiment, in the accompanying drawing, in which:

The cooling of liquid by flowing it from a reservoir over a cooled riffled surface or grid is old and the present invention includes an improved structure of grid, for such purpose. It also includes elements which function as a lid adapted to seat with a vacuumtight fit on the neck of the receiver, a reservoir carried by the lid, the top of the reservoir being adapted to receive, with a vacuumtight fit, the head of a milking machine, the grid being suspended from the lid beneath the reservoir, whereby the milk coming through the head drops into the reservoir and thence through the lid and down over the grid into the receiver.

The milking machine head is shown at H and the receiver at R. Either or both may be of any conventional or common type the head having milk tube connections, a vacuum head, connections for vacuum pipes leading from milking cups and connection with a main vacuum tube, all as diagrammatically illustrated and described in copending application of Elmer E. Lundvall, Serial No. 40,444, filed July 24, 1948, now abandoned.

Figure 8:
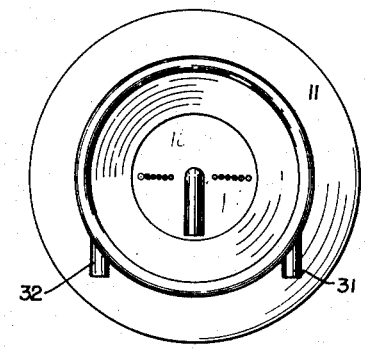
Figure 8 is a plan view of a different embodiment of the invention illustrating a simplified structure.
Figure 9:
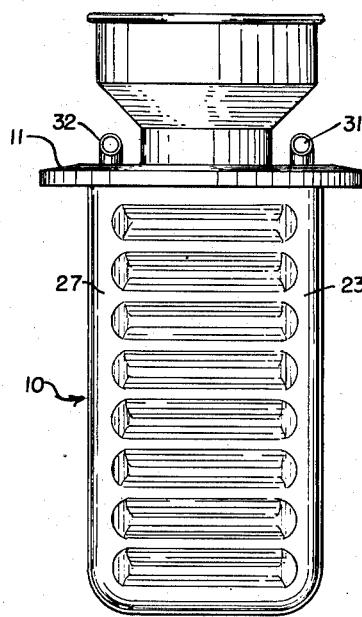
Figure 9 is an elevation of the embodiment illustrated in plan at Fig. 8.
Figure 6:
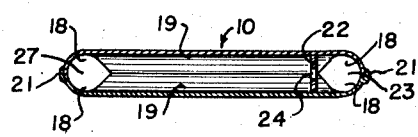
Figure 6 is a section taken on line 6—6 of Fig. 4.
Figure 7:
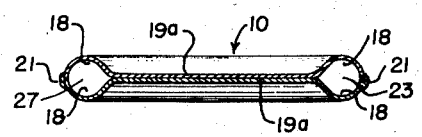
Figure 7 is a section taken on line 7—7 of Fig. 4.

The preferred embodiment of the invention, illustrated at Figs. 1 to 7, includes an annular cooling chamber surrounding the reservoir. The embodiment illustrated at Figs. 8 and 9 is substantially the same except for the omission of said annular cooling chamber. In both embodiments the device is a unit with no moving or normally separable parts, thus avoiding the danger of losing or misplacing parts, eliminating the use of all tools or appliances either for assembling the cooler with a receiver and milking machine head for operation or for disassembling it therefrom for use in another receiver, for cleaning or for other purposes. Such assembly and disassembly is accomplished practically instantaneously by the simplest of manual operations. The cooler is so constructed that all surfaces exposed to contact with the milk or with the atmosphere can be readily and thoroughly cleansed by the simplest and most common of washing implements and methods.

The grid indicated generally at 10 is provided with an annular flange 11 carrying and retaining, by its inwardly turned lower edge, a gasket 12 adapted to seat with a vacuumtight fit on the neck of a receiver R thus suspending the grid centrally of the neck of the receiver whereby milk flowing over the grid will drop within the receiver. The flange and gasket are made with a lateral expanse sufficient to fit a variety of sizes of receiver necks.

Within the flange 11 is a diaphragm 13, combining with the flange to form a lid or cover for the receiver and also performing other functions later described. The grid is secured to and suspended from the cover by any suitable means, not specially illustrated, and a reservoir 14 is seated upon and secured to the cover by any suitable means not specially illustrated. In the Figs. 1 to 7 embodiment the reservoir is formed of spaced outer and inner walls 14a and 14b, the space between the walls forming an annular cooling chamber 15 surrounding the reservoir. The top rim of the reservoir is formed to receive thereon, with a vacuumtight fit, the base of a conventional milking machine head H. Thus the cooler may be assembled with a receiver and milking machine by manually seating gasket 12 on the neck of the receiver, which positions the grid 10 centrally of the neck, and then manually seating the milking machine head on the rim of the reservoir, such assembly being illustrated at Fig. 1.

Within the inner wall 14b the diaphragm is provided with a row of orifices 16, aligned with the grid, through which milk from within the reservoir will drip or flow down onto the top edge of the grid. The diaphragm is also provided with an equalizing and overflow tube 17 which rises from the diaphragm preferably on an incline, as shown, and having its intake opening 17a vertical and thus shielded to prevent the dropping of milk from the head into the tube. The tube 17 terminates below the top of the reservoir whereby to serve as an overflow and prevent milk accumulating within the reservoir to a depth which would result in its backing up into the milking head vacuum lines. The tube 17 is also preferably provided with an auxiliary orifice 17b positioned a short distance above the diaphragm which serves as a supplement to orifices 16 whenever the milk in the reservoir rises to the height of orifice 17b. Thus the flow of the milk from the reservoir to the grid is held down to the capacity of orifices 16 unless and until the milk rises to orifice 17b, whereupon the flow is increased to the extent of the capacity of that orifice and when, as happens during the first stages of the milking of a cow, the flow into the reservoir is greatly increased and may exceed the combined capacity of orifices 16 and 17b and raise the milk level to the intake opening 17a, the tube 17 functions as an overflow to prevent the milk rising to the milking machine head. However, until this point is reached the orifices 16 and 17b serve to distribute the flow of milk evenly along the upper edge of the grid and to restrict the flow so as to keep as small a quantity of milk as possible flowing over the grid, providing a more efficient cooling.

The tube 17, being in open communication with both the reservoir and receiver, also functions as an equalizer of pressure as between the receiver and the reservoir and compensates as the milk rises in the receiver. The lower or outlet end of the tube is positioned centrally of the top edge of the grid so that milk flowing within the tube will drop therefrom onto the central part of the upper edge of the grid and spread out in both directions on both faces of the grid to maintain efficient operation even under overflow conditions.

Our improved grid is composed of two sheets of material, each of which is pressed or stamped so as to form a channel 18 along each longitudinal margin and a series of lateral channels 19 between, and terminating in, said longitudinal channels, the transverse channels alternating with transverse ridges 19a, whereby, when the two preformed sheets are mated and said ridges 19a are brought into contact there will be formed a grid having longitudinal marginal tubes and a series of lateral tubes extending between and terminating in said longitudinal tubes, said grid having outside faces laterally corrugated between said longitudinal marginal tubes. The contact ridges 19a are suitably sealed together as by spot welding and the ridges exposed at the top and bottom of the grid may be provided with suitable overlaps 20 to facilitate sealing. Likewise the longitudinal edges of the grid may be provided with suitable overlaps 21 to facilitate sealing.

Figure 4:
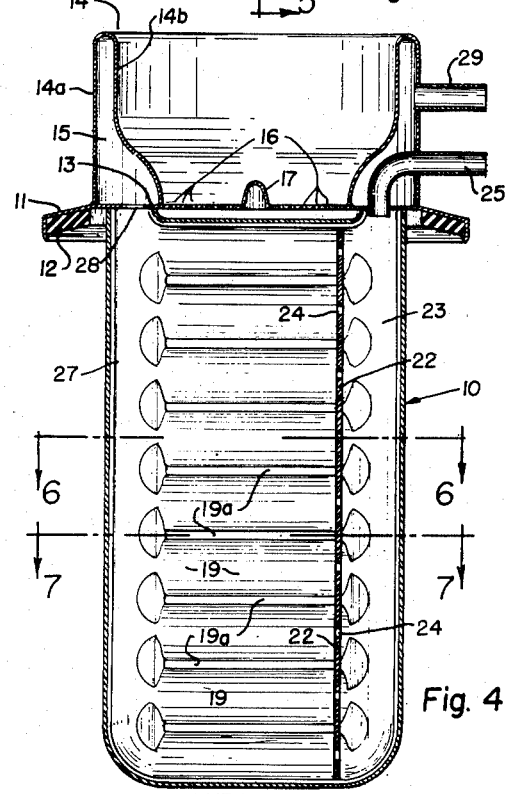
Figure 4 is a section taken on line 4—4 of Fig. 3.

A baffle plate 22 is positioned along the inner edge of that longitudinal tube which is to serve as the inlet tube for cooling fluid for the grid, indicated as 23 at Fig. 4. This plate is provided with orifices 24, one at the end of each lateral tube, which orifices are so restricted that their aggregate capacity is not greater than the capacity of tube 23, whereby fluid flowing through inlet tube 23 will fill the tube and flow simultaneously and substantially equally through all of the orifices 24 into and through the lateral tubes, thus insuring the substantially equal cooling of all of the lateral tubes.

Figure 1:
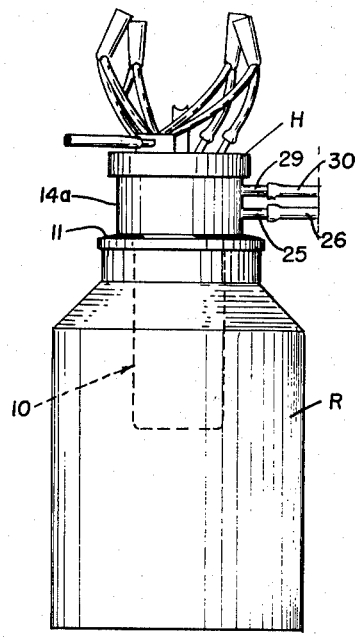
Figure 1 is an elevation of an assembly of conventional milking machine head, a conventional milk receiver or can and the present improved attachment, the cooling grid of the attachment being indicated, within the receiver, in broken lines.
Figure 3:
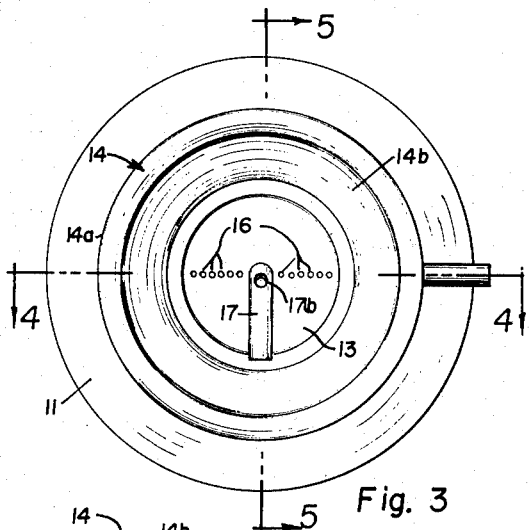
Figure 3 is a plan, on a further enlarged scale, of the attachment shown in elevation at Fig. 2.
Figure 2:
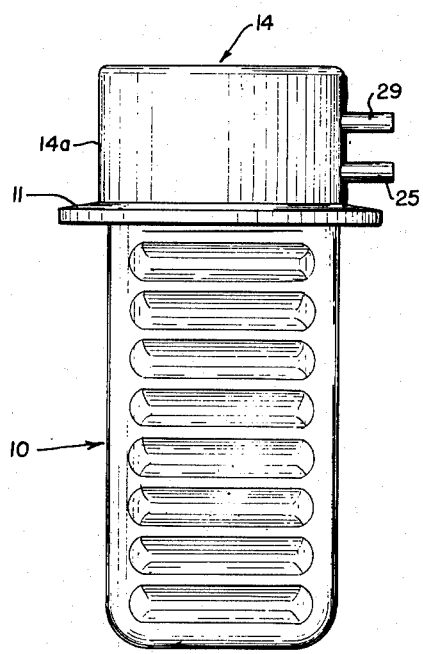
Figure 2 is an elevation, on enlarged scale, of the improved attachment.
Figure 5:
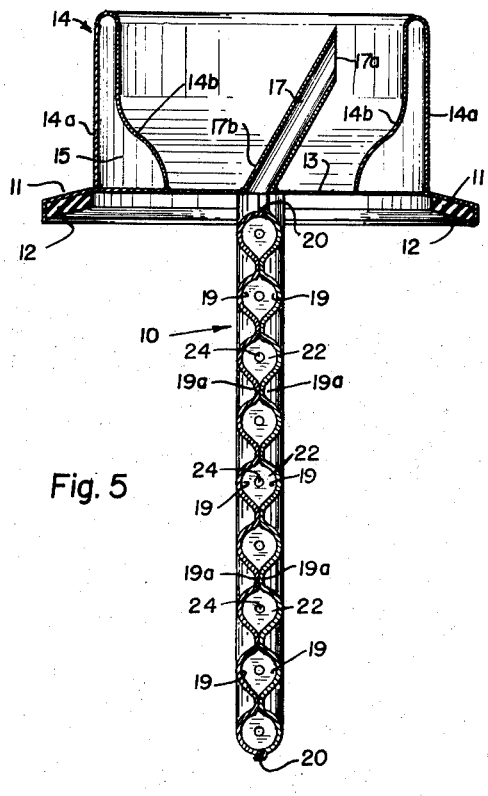
Figure 5 is a section taken on line 5—5 of Fig. 3.

Inner wall 14b of the reservoir is preferably sloped inwardly as clearly illustrated at Figs. 3, 4 and 5, thus widening the cooling chamber 15 at the bottom and providing a convenient space to accommodate pipe 25 for conducting cooling fluid (coming from an outside source, not shown, through hose or pipe 26) to tube 23.

The ends of the lateral tubes, opposite baffle plate 22, open unrestrictedly into marginal longitudinal tube 27 and the fluid passes from the lateral tubes into tube 27 and thence through an orifice 28, provided in the cover, into annular cooling chamber 15 from the upper part of which there is provided an outlet, as pipe 29 with a hose 30, leading to any desired point of discharge.

The embodiment illustrated at Figs. 8 and 9 is the same as that illustrated in the preceding figures and already described herein, except that the outside wall of the reservoir is omitted, thus eliminating the cooling chamber 15. This requires a change in location and relative positions of the inlet and discharge conduits for cooling fluid. Inlet conduit 31 receives fluid from any suitable source, not shown, and leads it into tube 23 whence it flows through the lateral tubes and into tube 27, as in the previously described embodiment. Outlet conduit 32 communicates with tube 27 through the cover and receives fluid flowing upwardly from tube 27 and conducts it to any desired point of discharge, not shown. Otherwise the structure and operation of the Figs. 8 and 9 embodiment are the same as already described in connection with the Figs. 1 to 7 embodiment.

It will be seen that we have provided a cooling unit which can be attached to or incorporated in a milking machine by the simple act of lifting the head from the receiver and manually seating the cooler on the receiver neck and the head on the cooling reservoir, whereupon the assembly is ready for milking operations and for the automatic delivery of cooled milk to the receiver. It will also be seen that we have provided for the restricted or regulated flow of milk from the reservoir but have also safeguarded against the backsetting of the milk from the reservoir into the milking head. It will further be noted that we have provided a grid which is of simple and economical construction but of high efficiency in operation because of maintaining the principle of simultaneous supply of cooling fluid in substantially equal quantities to all of the transverse tubes of the grid, and further that the grid is coordinated with both the normal and overflow outlets of the reservoir and, likewise, with the cooling chamber when such chamber is incorporated in the unit. Moreover, all moving or normally separable parts have been eliminated as has the use of tools or appliances for assembly or disassembly and the entire unit is so constructed that to insure absolute cleanliness nothing is required beyond ordinary washing implements and methods.

While we have illustrated and described many details of construction, alternatives and equivalents will occur to those skilled in the art and within the expected exercise of such skill and within the spirit and scope of the foregoing description and the appended claims, and we do not wish to be limited in our protection to the details illustrated and/or described.

We claim:

1. In apparatus of the class described, a milk receiver, a milking head provided with milk emitting means and suction connection, a cooling unit including a lid covering said receiver with a fluidtight fit, a reservoir carried by and above said lid, having fluid connection with the receiver, and adapted to receive milk from said head and covered by said milking head with a fluidtight fit, whereby to maintain subatmospheric pressure within the receiver and the reservoir, a cooling element carried by and beneath said lid, and positioned to receive milk from said reservoir, and a conduit interconnecting the reservoir and receiver for equalizing the subatmospheric pressures therein.

2. Apparatus as defined in claim 1 in which the conduit is constructed and arranged to receive, in its upper end, milk rising above a predetermined level in the reservoir and lead such received milk into the receiver.

3. Apparatus as defined in claim 1 in which the conduit is constructed and arranged to receive, in its upper end, milk rising above a predetermined level in the reservoir and lead such received milk into the receiver and in which the lower end of said conduit opens above, and is thereby adapted to deliver milk onto the cooling element.

4. Apparatus as defined in claim 1 in which said reservoir is provided with an annular cooling-fluid chamber adapted to pre-cool milk in the reservoir, said fluid connection being restricted, whereby to accumulate milk in the reservoir said conduit providing an overflow to prevent accumulated milk back-setting into the milking head.

5. Apparatus as defined in claim 1 in which said reservoir is provided with an annular cooling-fluid chamber and an orifice between the chamber and the cooling element whereby cooling fluid circulated in the element can thence pass to the chamber.

6. Apparatus as defined in claim 1 in which said conduit is a tube opening downwardly through and rising upwardly from the bottom of the reservoir and having its upper opening shielded against the dropping of liquid thereinto from above.

7. Apparatus as defined in claim 1 in which said conduit is a tube opening downwardly through and rising at an inclination upwardly from the bottom of the reservoir.

8. Apparatus as defined in claim 1 in which said conduit is a tube rising from the bottom of the reservoir at an inclination and having its upper end opening in a vertical plane.

9. In a milking machine having a milk receiver and a suction connected, milk emitting milking head, a milk cooling part of said machine comprising the following items combined into a unitary structure; a lid having a fluidtight seat on the receiver, a reservoir above the receiver and seating against the head with a fluidtight fit, a cooling element beneath the lid, fluid connection between the bottom portion of the reservoir and the receiver and a pressure equalizing conduit interconnecting the receiver and the reservoir.

10. In apparatus as defined in claim 9, means for accumulating milk in the reservoir, said conduit providing an overflow from the reservoir to the receiver and a cooling chamber around the reservoir.

11. In apparatus as defined in claim 10, said cooling element being adapted for circulating cooling fluid through the cooling element and the chamber.

12. As a new article of manufacture, a cooling unit, for a milk receiver, constructed and arranged to be inserted between and form fluidtight connections with said milk receiver and a milk emitting, suction connected head of a milking machine, comprising, as a unitary structure, a covering lid member for a receiver, a cooling element carried by and beneath said lid member, a reservoir carried by and above the lid member and having a top rim constructed and arranged to seat against a milk emitting, suction connected milking head with a fluidtight fit, whereby to maintain subatmospheric pressure within the reservoir and receiver when the unit is positioned on the receiver and seated against the head, fluid connection between the lower potrion of the reservoir and the receiver and a pressure equalizing conduit interconnecting the upper portion of the reservoir and the receiver.

13. In a device as defined in claim 12, the fluid connection being restricted, whereby to accumulate milk in the reservoir, a cooling fluid chamber around the reservoir to cool such accumulated milk, said conduit providing an overflow tube leading from the upper part of the reservoir and constructed and arranged to deliver milk, flowing therethrough, to and upon the cooling element.

ELMER E. LUNDVALL.
RALPH W. BECKER.
CONRAD ECKSTEIN.

REFERENCES CITED

The following references are of record in the file of this patent:

UNITED STATES PATENTS

| Number | Name | Date |
|---|---|---|
| 1,852,219 | Sahnow et al. | Apr. 5, 1932 |
| 2,200,426 | Lehman | May 14, 1940 |

FOREIGN PATENTS

| Number | Country | Date |
|---|---|---|
| 448,064 | Great Britain | May 29, 1936 |
| 15,034 | Denmark | Aug. 18, 1911 |
| 44,629 | Denmark | Sept. 21, 1931 |